(12) United States Patent
Mortensen et al.

(10) Patent No.: US 12,536,234 B2
(45) Date of Patent: Jan. 27, 2026

(54) AUTO-CREATION OF AUTONOMOUS TECHNICAL SUPPORT CASES

(71) Applicant: Cisco Technology, Inc., San Jose, CA (US)

(72) Inventors: Magnus Mortensen, Cary, NC (US); Kevin D. McCabe, Raleigh, NC (US); David C. White, Jr., Petersburg, FL (US); Mohammed Hamzeh, Woluwe-Saint-Lambert (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 74 days.

(21) Appl. No.: 18/392,101

(22) Filed: Dec. 21, 2023

(65) Prior Publication Data
US 2025/0209122 A1    Jun. 26, 2025

(51) Int. Cl.
*G06F 16/93* (2019.01)
*G06N 3/0475* (2023.01)

(52) U.S. Cl.
CPC .......... *G06F 16/93* (2019.01); *G06N 3/0475* (2023.01)

(58) Field of Classification Search
None
See application file for complete search history.

(56) References Cited

U.S. PATENT DOCUMENTS

| | | |
|---|---|---|
| 9,436,758 B1 | 9/2016 | Lewis et al. |
| 2017/0011308 A1 | 1/2017 | Sun et al. |
| 2017/0364583 A1 | 12/2017 | Buryak et al. |
| 2020/0210439 A1 | 7/2020 | Bar-On et al. |
| 2022/0237626 A1 | 7/2022 | White et al. |
| 2023/0229680 A1 | 7/2023 | Verma |
| 2023/0410003 A1* | 12/2023 | Haynes, III ............ G06F 40/40 |
| 2024/0386203 A1* | 11/2024 | Mably .................. G06F 40/284 |
| 2024/0386213 A1* | 11/2024 | Ghoche ............. G06Q 30/0201 |
| 2024/0412048 A1* | 12/2024 | Knudson ................ G06F 40/40 |

* cited by examiner

*Primary Examiner* — Christopher J Raab
(74) *Attorney, Agent, or Firm* — Edell, Shapiro & Finnan, LLC

(57) ABSTRACT

A technical support system identifies a plurality of technical support cases that were previously resolved and identifies related technical support cases of the plurality of technical support cases based on problem descriptions and resolution summaries associated with the plurality of technical support cases. A Large Language Model (LLM) is used to create an initial contact template for potential technical support issues associated with the related technical support cases. Question and answer pairings associated with the potential technical support issues are identified based on communications in the related technical support cases. A machine learning model is trained to communicate with potential users associated with the potential technical support issues based on the question and answer pairings. The initial contact template and the machine learning model are used to resolve a subsequently received technical support issue associated with the related technical support cases.

20 Claims, 11 Drawing Sheets

HUMAN EXAMPLE 2

Hello Customer A,

My name is Person B, from Company. I will be the engineer assisting you in this service request.
I am sending this email as an initial point of contact and to let you know that I have taken ownership of your case.

I understand from the case notes that you have a device that crashed multiple times.

Please upload the crash info file, I will check the outputs and let you know of my findings. Running "term pager 0" before will help the output complete quickly. Don't forget to reset the pager back to the default with "term pager 24".

Please make sure to always keep attach@company.com in the CC list so that the SR is updated automatically, and delete the lines from previous emails in order to keep the case notes clear.

Thanks you
Kind regards,
Person B
Company Firewall Team
Phone: +1-555-123-4567
Email: PersonB@company.com
Business Day Hours: Monday to Friday 7:00 AM - 3:00 PM GMT

FIG. 6B

HUMAN EXAMPLE 3

Hello Customer B,

Hope you are doing well. My name is Person C from Company Security Team and I have taken ownership of your case SR 45678 and will be assisting you. This email is an initial point of contact so you can see my working hours and so you know how to reach out to me.

Could you provide show tech/troubleshooting file from this device?

You can upload the crash (plain text only please, not zip or rtf) file via the link here: https://company.com/SR45678 ⎯ 622
Will be looking forward to hearing from you. You can check my contact details and working hours in the signature below.

Thanks in advance.

Kind regards,
Person C
Company Security Team
Phone: +1-555-123-5678
Email: PersonC@company.com

AUTOMATED INITIAL CONTACT RESULT

```
Hello <CUSTOMER_NAME>,
My name is <VIRTUAL_TAC_ENGINEER_NAME> and I have ownership of your Service Request
<SERVICE_REQUEST_NUMBER>. I am sending this email as an initial point of contact.

Based on you problem description, it sounds like the device might have crashed
Please do the following:

Log on to the CLI of the device that crashed via SSH/Telnet (Note: this may currently be the
STANDBY device if you have an HA failover-pair and the roles have changed).
-If the device is deployed in Firepower Threat Defense (FTD) mode, first issue the command
"system support diagnostic-cli" and then "enable"
-Run the command "term pager 0" to prevent the device from pausing the output with "---More---"
prompts.
- Then the command "show crashinfo" and save the output to a text file
- Then reset the terminal length with "term pager 24"

Reply-all to this email and attach that file or go to https://company.com/SR<SERVICE_REQUEST_NUMBER>
and upload the file there Please upload/email plain text files, not rtf and do not zip them.

I will analyze the crash file and try to determine the bug that is causing it, and how to mitigate the
problem.
Sincerely,
<VIRTUAL_TAC_ENGINEER_NAME>
Technical Consulting Engineer, Virtual
Company Customer Experience
Email: <VIRTUAL_TAC_ENGINEEREMAIL>@company.com
```

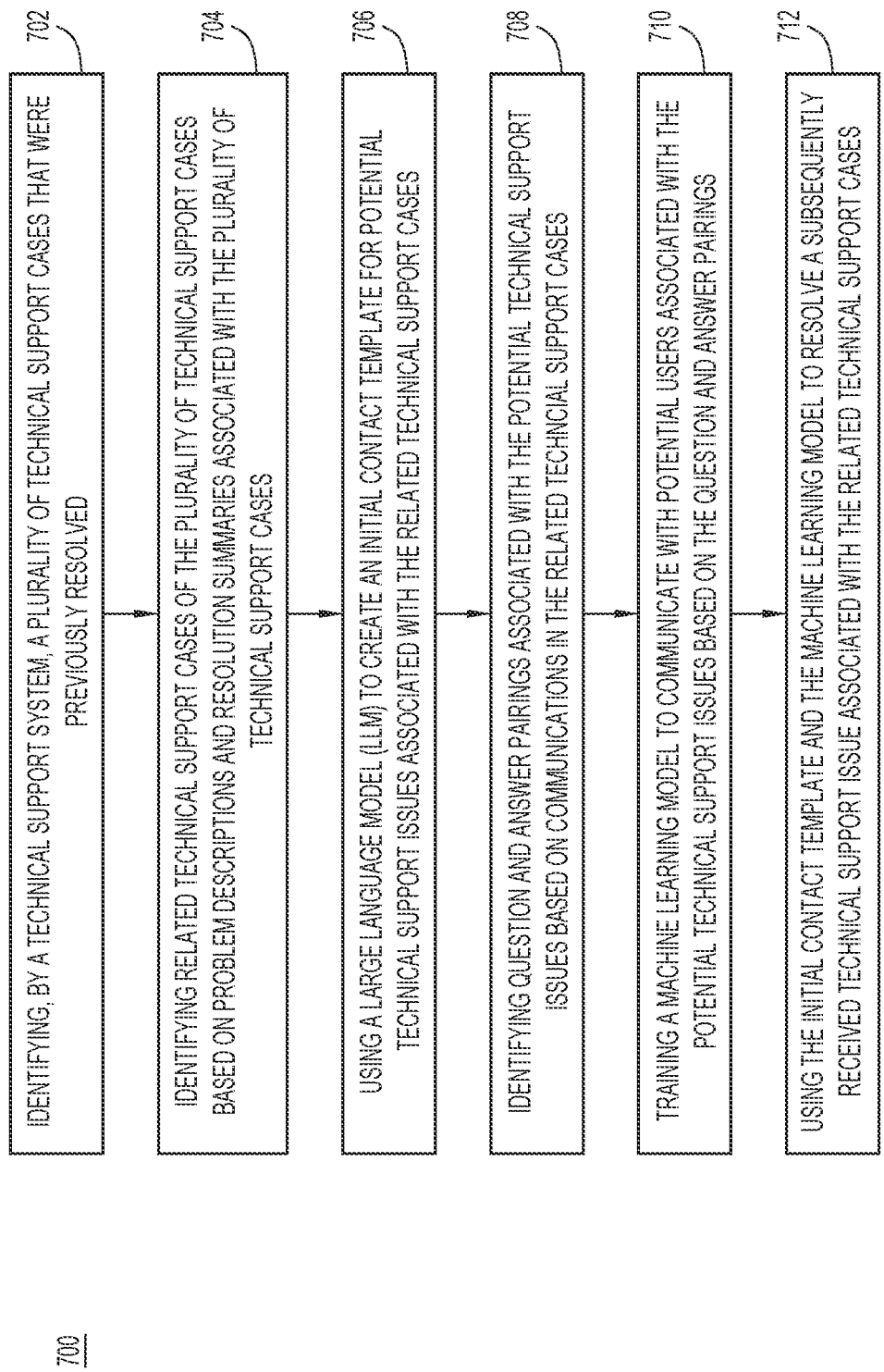

AUTO-CREATION OF AUTONOMOUS TECHNICAL SUPPORT CASES

TECHNICAL FIELD

The present disclosure relates to technical support systems.

BACKGROUND

It is beneficial to identify common technical support issues that have been solved by technical support experts to develop automatic case handling for incoming related technical support issues. Today, technical support experts comb through thousands of technical support cases and analyze the case problems, symptoms, and resolution summaries to identify areas where there are common issues being resolved by support teams. Once common issues have been identified, the technical support experts build out an elaborate series of trainings that will enable the system to respond to users with similar technical support issues using automated cause handling.

BRIEF DESCRIPTION OF THE DRAWINGS

FIGS. 6A-6C are exemplary initial communications associated with technical support issues that were sent to users by technical support engineers, according to an example embodiment.

FIG. 6D is an exemplary initial communication template derived from the initial communications sent to users, according to an example embodiment.

FIG. 7 is a flow diagram illustrating a method of developing automatic case handing for related technical support cases, according to an example embodiment.

DETAILED DESCRIPTION

Overview

Figure 1:
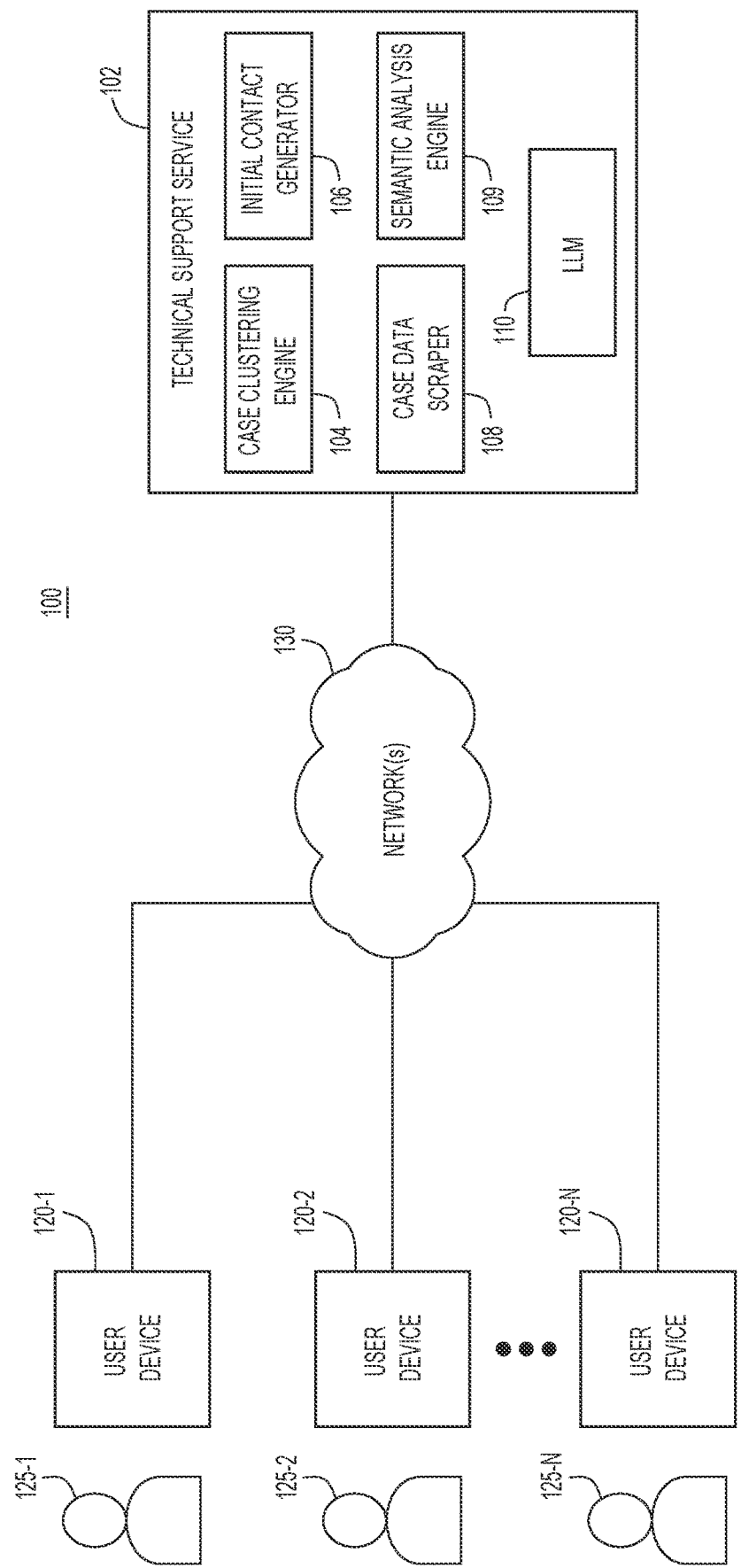
FIG. 1 is a block diagram of a technical support system configured to identify related technical support issues and develop automatic case handling for related technical support cases, according to an example embodiment.

In one embodiment, a computer-implemented method is provided for developing an automated technical support case handling for related technical support cases. The method includes identifying, by a technical support system, a plurality of technical support cases that were previously resolved and identifying related technical support cases of the plurality of technical support cases based on problem descriptions and resolution summaries associated with the plurality of technical support cases. The method includes using a Large Language Model (LLM) to create an initial contact template for potential technical support issues associated with the related technical support cases. Question and answer pairings associated with the potential technical support issues are identified based on communications in the related technical support cases and a machine learning model is trained to communicate with potential users associated with the potential technical support issues based on the question and answer pairings. The initial contact template and the machine learning model are used to resolve a subsequently received technical support issue associated with the related technical support cases.

Example Embodiments

Automated or virtual technical support services are frequently used to address technical support issues. A technology user may transmit an electronic communication to a technical support service and a software emulated "humanoid" process of the technical support service may communicate with the user and perform actions to address the support issue. The humanoid may communicate with the user as a human would to, for example, gather additional information or respond to questions raised by the user. The humanoid includes a computer executed process for mimicking human dialog. In other words, the humanoid process software includes software, which when executed by a computer processor, can mimic human dialog. The humanoid can ask a user questions and respond to questions or statements from a user. In addition to communicating with a user, the humanoid identifies technical support issues in electronic communications and performs actions to address the technical support issues.

Modern generative LLMs are able to answer questions and solve common problems. However, for companies that produce custom/specific products, one fine-tunes the LLMs for the LLMs to know how to solve problems on these products. Fine-tuning still requires a significant number (e.g. thousands to tens of thousands) of problem/solution pairings. This becomes a significant hurdle for not just net-new problems, but also for problems (and products) that do not generate a significant volume of technical support cases.

A core challenge of developing an automated approach to resolving technical support issues for products that do not generate a significant volume of technical support cases is the limited volume of similar support cases. Therefore, fine-tuning an LLM with a large corpus of case information is not feasible for many products for some companies. Techniques described herein provide a means for automated training of a semantic analysis model to address technical support issues using a limited volume of existing cases (e.g., a training set) in a just-in-time manner.

Thus, present embodiments improve the technical field of automated technical support by identifying related customer support cases that have been resolved and developing an initial communication template and question and answer pairings that may be used by a trained machine learning model to communicate with a user associated with a related customer support issue and resolve the customer support issue. Present embodiments therefore increase the efficiency of automated technical support services by eliminating or minimizing human oversight when identifying related customer support cases and resolving the customer support cases. Thus, present embodiments provide the practical application of a technical support system that identifies technical support cases with the same technical support problem and resolution summaries and develops means for resolving potential customer support issues that are related to the technical support cases.

Reference is first made to FIG. 1. FIG. 1 shows a block diagram of a system 100 that is configured to identify related technical support issues and develop automatic case handling for related technical support cases. The system 100 includes a technical support service 102 and a plurality of user devices 120-1, 120-2, . . . , 120-N that communicate with technical support service 102 via one or more networks 130. Each user device 120-1 to 120-N is associated with a user 125-1, 125-2, . . . , 125-N. The technical support service 102 includes a case clustering engine 104, an initial contact generator 106, a case data scraper 108, a semantic analysis engine 109, and an LLM 110.

The technical support service 102 includes a plurality of devices (e.g., processors, controllers, data storage devices, etc.) configured to communicate with users 125-1 to 125-N of user devices 120-1 to 120-N as a human would and perform actions to address technical support issues described in electronic communications received from the users 125-1 to 125-N of user devices 120-1 to 120-N. The technical support service 102 may receive an electronic communication from a user that includes information outlining a technical support issue. The technical support service 102 includes a humanoid that has been trained (e.g., using machine learning) to communicate with the user to gather information and respond to questions in a manner such that the user may be unable to distinguish between communicating with the humanoid and communicating with a human, such as a technical assistance center engineer. The technical support service 102 is additionally trained to resolve the technical support issues. The technical support service 102 may use machine learning models to address and resolve technical support issues. Based on the information received from one or more users, technical support service 102 is able to diagnose issues, perform actions to resolve issues, and communicate with users in a manner consistent with that of a human.

Each of user devices 120-1 to 120-N may be a tablet, laptop computer, desktop computer, Smartphone, virtual desktop client, virtual whiteboard, or any user device now known or hereinafter developed. User devices 120-1 to 120-N may have a dedicated physical keyboard or touchscreen capabilities to provide a virtual on-screen keyboard to enter text. User devices 120-1 to 120-N have the capability to send and receive electronic communications (e.g., emails, chats, messaging communications received via a messaging application or messaging web-service, etc.). For example, users 125-1 to 125-N may use user devices 120-1 to 120-N to send electronic communications (e.g., associated with a technical support issue) to and receive electronic communications from technical support service 102.

In the example illustrated in FIG. 1, a user 125-1 of user device 120-1 may have transmitted an electronic communication to technical support service 102 with information about a technical support issue that needs to be resolved. User 125-1 may have communicated with technical support service 102 (e.g., a humanoid) or a technical support engineer to resolve the technical support issue. For example, upon receiving the communication, a technical support engineer may have sent user 125-1 an initial communication introducing himself or herself, assigning a case number to the technical support issue, and providing additional information. For example, the initial communication may ask addition questions and/or provide possible resolutions to the technical support issue. User 125-1 may respond to the technical support engineer with answers, information, and/or questions. The technical support engineer may work to resolve the technical support issue based on information provided by the user 125-1.

Techniques described herein leverage histories associated with resolved technical support cases to automate resolving subsequently received technical support issues. For example, by identifying related technical support problems that have related technical support solutions, technical support service 102 may be able to automatically resolve subsequently received technical support issues with the same or similar technical support problems without human intervention. For example, a humanoid of the technical support service 102 may be able to communicate with a user 125-1 to 125-N in the same manner as a technical support engineer would to gather information, offer guidance, and resolve the technical support issue.

As illustrated in FIG. 1, technical support service 102 includes a case clustering engine 104, initial contact generator 106, case data scraper 108, semantic analysis engine 109, and LLM 110. As described further below, case clustering engine 104 derives the most closely related technical support cases (e.g., technical support issues that have been resolved) based on problem descriptions and resolutions associated with the technical support cases. Initial contact generator 106 produces a "first contact" or initial communication for technical support service 102 to send to a user associated with a technical support issue. The initial communication introduces a virtual support engineer (or humanoid), indicates a service request number for a technical support issue, and attempts to resolve the technical support issue based on resolutions in similar technical support cases.

Case data scraper 108 leverages LLM 110 to extract the most poignant question and answer trainings based on questions and answers from communications exchanged in previous related technical support cases. Semantic analysis engine 109 builds/tunes a machine learning semantic analysis model based on the LLM extracted learnings. For example, the semantic analysis model may be used during campaign activation to automatically resolve (or attempt to resolve) new cases that are clustered with the most closely related technical support cases.

Figure 2:
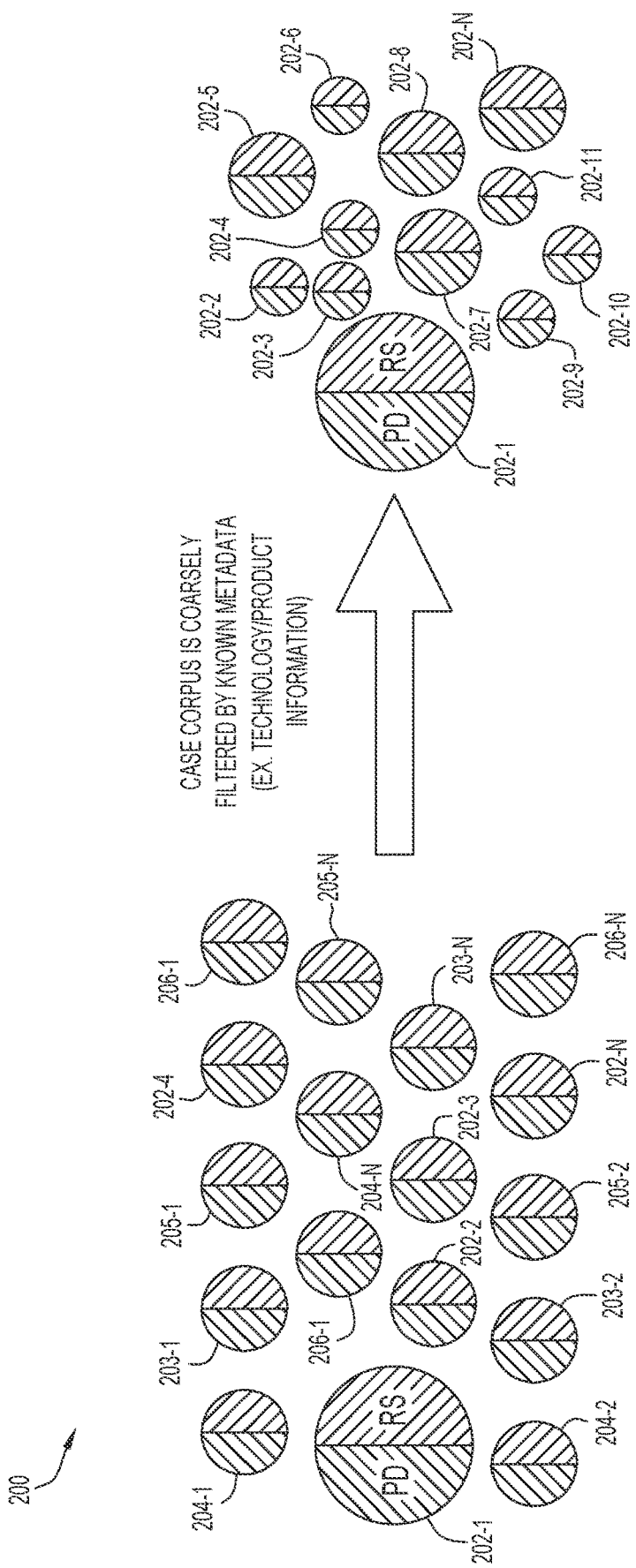
FIG. 2 is a diagram illustrating filtering technical support cases based on metadata, according to an example embodiment.

To build a campaign to automatically resolve incoming technical support cases, case clustering engine 104 is first leveraged to cluster previously resolved technical support cases to identify the most closely-related technical support cases to use to automate a technical support issue resolution. Reference is now made to FIG. 2. FIG. 2 is a diagram illustrating the filtering of technical support cases that will be used to build an automated technical support campaign. A corpus of technical support cases 200 may be associated with different technologies or products. For example, one technology area may be security and within the security technology, technical support cases may be filtered based on whether the technical support cases are associated with firewalls, access control servers, or intrusion prevention. Each of those categories may further be filtered and classified to identify technical support cases associated with different specific areas of a technology (e.g., access control list, network access translation (NAT), crash, etc.).

As illustrated in FIG. 2, technical support cases 202-1, 202-2, 202-3, 202-4, . . . , 202-N may be associated with one technology/product information, technical support cases 203-1, 203-2, . . . , 203-N may be associated with another technology/product information, technical support cases 204-1, 204-2, ..., 204-N may be associated with another technology/product information, technical support cases 205-1, 205-2, ..., 205-N may be associated with a different technology/product information, and technical support cases 206-1, ..., 206-N may be associated with yet another technology/product information. Before artificial intelligence (AI) may be leveraged to dynamically build the automated technical support campaign, the desired technical support cases (i.e., the technical support cases related to the desired technology/product information) are identified by filtering the corpus of technical support cases 200. For example, the corpus of technical support cases 200 may be filtered by known metadata/metrics associated with the cases (e.g., technology, product, duration, etc.) to filter out the technical support cases associated with a particular technology/product information. As illustrated in FIG. 2, the corpus of technical support cases 200 are filtered to identify technical support cases 202-1, 202-2, 202-3, 202-4, 202-5, 202-6, 202-7, 202-8, 202-9, 202-10, 202-11, ..., 202-N that are all related to the same technology/product information.

Figure 3:
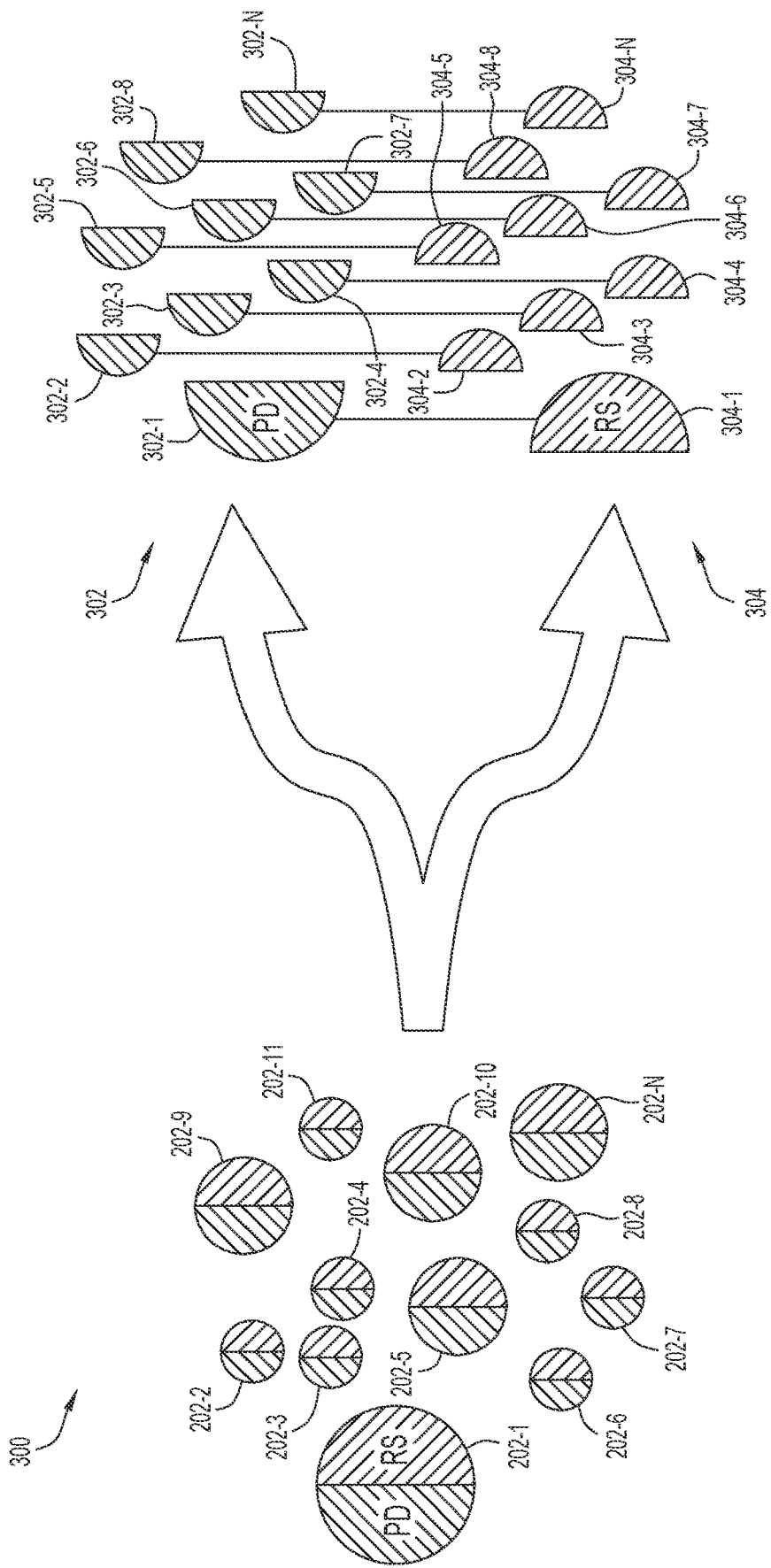
FIG. 3 is a diagram illustrating the creation of problem description and resolution summary datasets for technical support cases, according to an example embodiment.

Reference is now made to FIG. 3. FIG. 3 is a diagram illustrating an example 300 of extracting a problem description (PD) and the resolution summary (RS) from each filtered technical support case. Each technical support case may include a problem description that describes the problem or issue that a user is experiencing and a resolution summary indicating how the technical support case was resolved. The problem description may be determined from an initial communication sent from a user to technical support service 102 and/or additional information or answers received from the user in additional communications. The resolution summary may give an overview of actions that were taken that resolved the problem or technical support issue.

As illustrated in FIG. 3, the technical support cases 202-1 to 202-N are divided into a problem description dataset 302 and a resolution summary dataset 304. The problem description dataset 302 includes the problem descriptions 302-1, 302-2, 302-3, 302-4, 302-5, 302-6, 302-7, 302-8, ..., 302-N from the technical support cases 202-1 to 202-N and the resolution summary dataset 304 includes the resolution summaries 304-1, 304-2, 304-3, 304-4, 304-5, 304-6, 304-7, 304-8, ..., 304-N associated with the technical support cases 202-1 to 202-N. As illustrated in FIG. 3, each problem description 302-1 to 302-N is associated with a corresponding resolution summary 304-1 to 304-N. For example, problem description 302-1 is associated with resolution summary 304-1 from technical support case 202-1.

Figure 4:
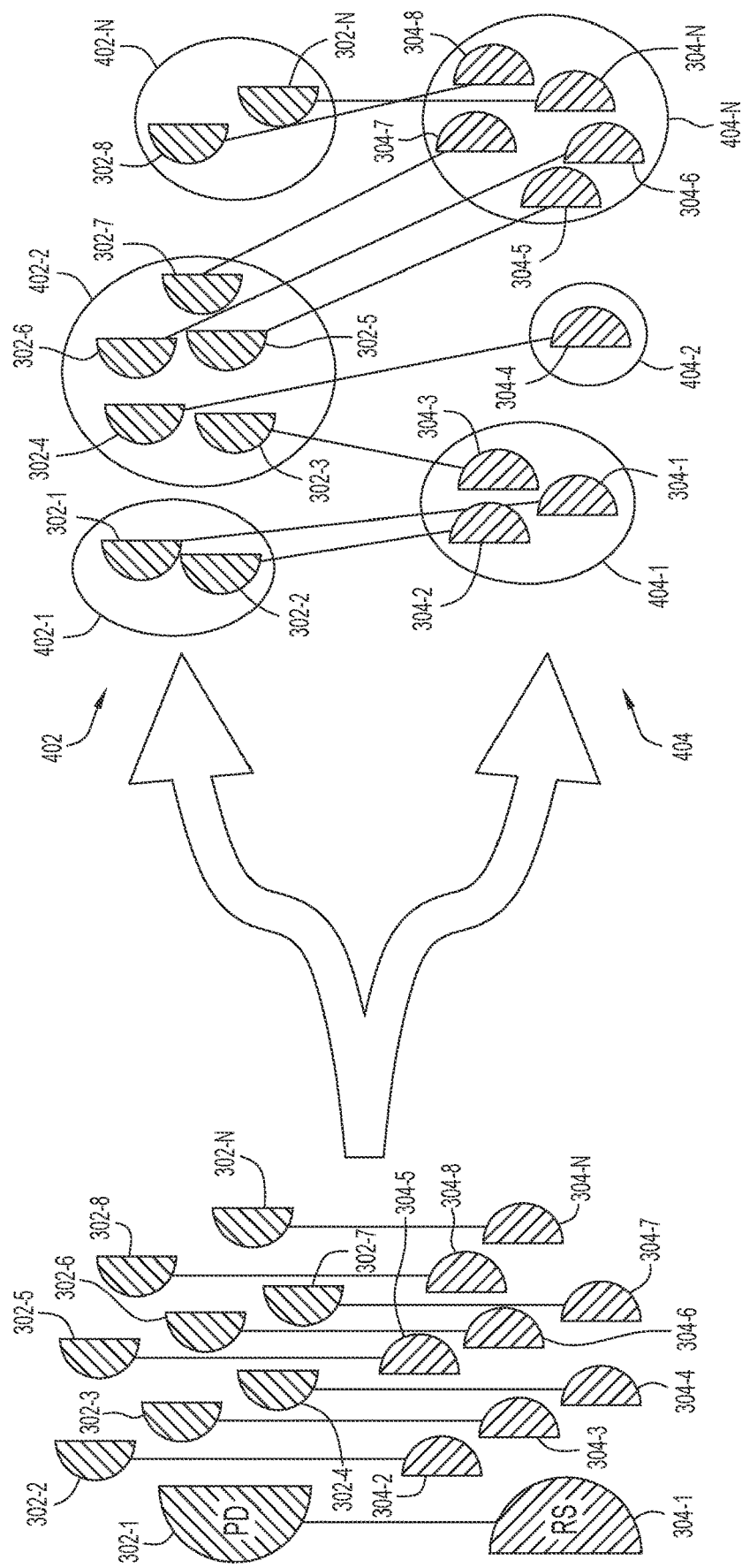
FIG. 4 is a diagram illustrating clustering problem descriptions and resolution summaries, according to an example embodiment.

Reference is now made to FIG. 4. FIG. 4 is a diagram illustrating clustering the problem descriptions 302-1 to 302-N in the problem description dataset 302 and clustering the resolution summaries 304-1 to 304-N in the resolution summary dataset 304. A clustering pass is run across the problem description dataset 302 and the resolution summary dataset 304 to identify closely matching items from each dataset. As illustrated in FIG. 4, clustering of problem descriptions 302-1 to 302-N in the problem description dataset 302 produces problem description clusters 402-1, 402-2, ..., 402-N and clustering of the resolution summaries 304-1 to 304-N in the resolution summary dataset 304 produces resolution summary clusters 404-1, 404-2, ..., 404-N. The problem description clusters are collectively referred to with reference numeral 402 and the resolution summary clusters are collectively referred to with reference numeral 404.

Problem descriptions that are clustered in the same cluster are more closely related than problem descriptions in different clusters. Likewise, resolution summaries clustered in the same cluster are more closely related than resolution summaries in different clusters. For example, problems descriptions in cluster 402-1 may be associated with the same (or very similar) problem or technical support issue and resolution summaries in cluster 402-1 may be associated with the same (or very similar) resolution to a problem/technical support issue.

Figure 5:
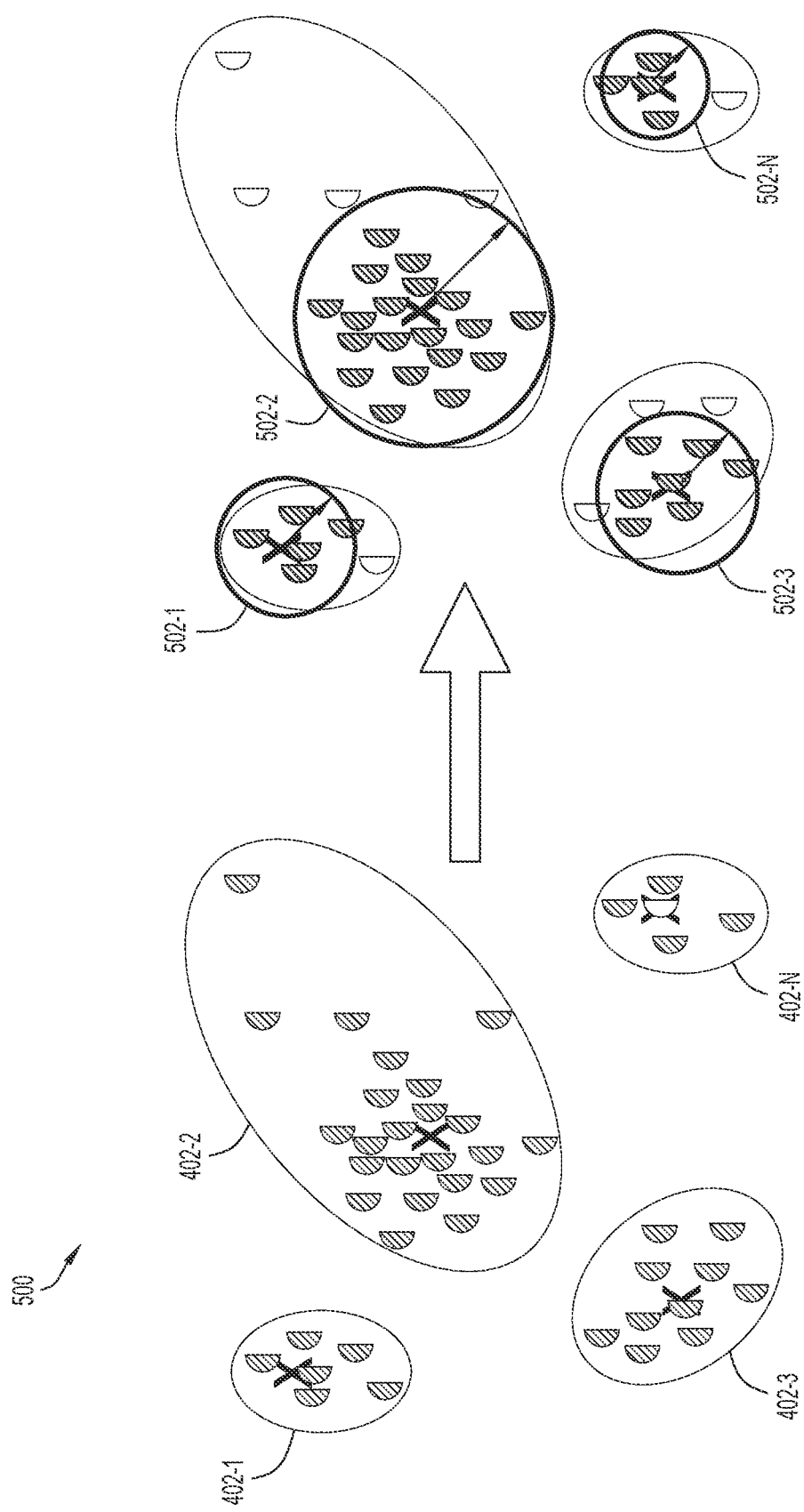
FIG. 5 is a diagram illustrating refining problem description clusters and resolution summary clusters, according to an example embodiment.

Reference is now made to FIG. 5. FIG. 5 is a diagram illustrating an example 500 of refining the problem description clusters 402-1 to 402-N and the resolution summary clusters 404-1 to 404-N. As illustrated in FIG. 5, a subset of items (i.e., problem descriptions or resolution summaries) in each cluster is selected based on the distance of each item to the centroid of the cluster. In the example illustrated in FIG. 5, clusters 402-1, 402-2, 402-3, ..., 402-N are refined to produce refined clusters 502-1, 502-2, 502-3, ..., 502-N that include the closest problem descriptions to the centroid of the clusters 402-1 to 402-N. For example, the refined clusters 502-1 to 502-N may include the closest 75% of the items to the centroid of the cluster. Refining the clusters reduces the "noise" in the clusters. In other words, refining the clusters produces clusters of items that are even more contextually similar than the items in the unrefined clusters by eliminating the least similar items from the cluster. Although FIG. 5 illustrates an example in which problem description clusters are refined, resolution summary clusters are also refined to select a subset of resolution summaries in the clusters that are closest to the centroid of the cluster.

After the clusters have been refined, refined clusters with overlapping cases are identified. A refined problem description cluster and a refined resolution summary cluster have overlapping cases if the refined problem description cluster includes problem descriptions associated with particular technical support cases and the refined resolution summary cluster includes resolution summaries associated with the same technical support cases. For example, referring back to FIGS. 3 and 4, problem description cluster 402-2 and resolution summary cluster 404-N have overlapping cases 202-5, 202-6, and 202-7 because problem descriptions 302-5, 302-6, and 302-7 are in cluster 402-2 and resolution summaries 304-5, 304-6, and 304-7 are in resolution summary cluster 404-N.

The overlapping refined clusters represent technical support cases in which similar problems were described and similar resolutions were used to resolve the similar problems. When the overlapping technical support cases have been identified, the overlapping cases are used to create an initial contact communication and question/answer pairings for automating resolution of subsequently received technical support issues whose problem description would fit into the same cluster as the problem descriptions of the overlapping technical support cases.

Referring back to FIG. 1, initial contact generator 106 is used to generate an initial contact template to use to produce an initial contact communication to send to a user when a new technical support issue is received at technical support service 102. In automated workflows, the greatest success occurs when the first contact with a user associated with a technical support issue fully resolves the issue. Complexity grows if the conversation moves into further back-and-forth questions and answers. Therefore, when a user sends a communication with a technical support issue to technical support service 102, ideally the technical support service 102 responds with an initial communication that includes a solution or resolution for the issue. To produce a well-formed initial contact communication (which is typically an email, but may be another form of communication, such as a chat on a communication or conferencing application), the initial contact communications from the overlapping technical support cases are leveraged.

The initial contact communications from the overlapping technical support cases are provided to LLM 110 with instructions to generate an initial contact template that can be used for subsequent technical support issues with problem descriptions that are clustered with the problem descriptions of the overlapping cases. More specifically, the initial communication template can be created by the LLM 110 by taking the initial contact communications created by technical support engineers associated with the overlapping technical support cases, providing the initial contact communications to the LLM 110, and asking the LLM 110 to generate an initial communication template that aligns with the structure and intent of the provided initial communications.

Figure 6A:
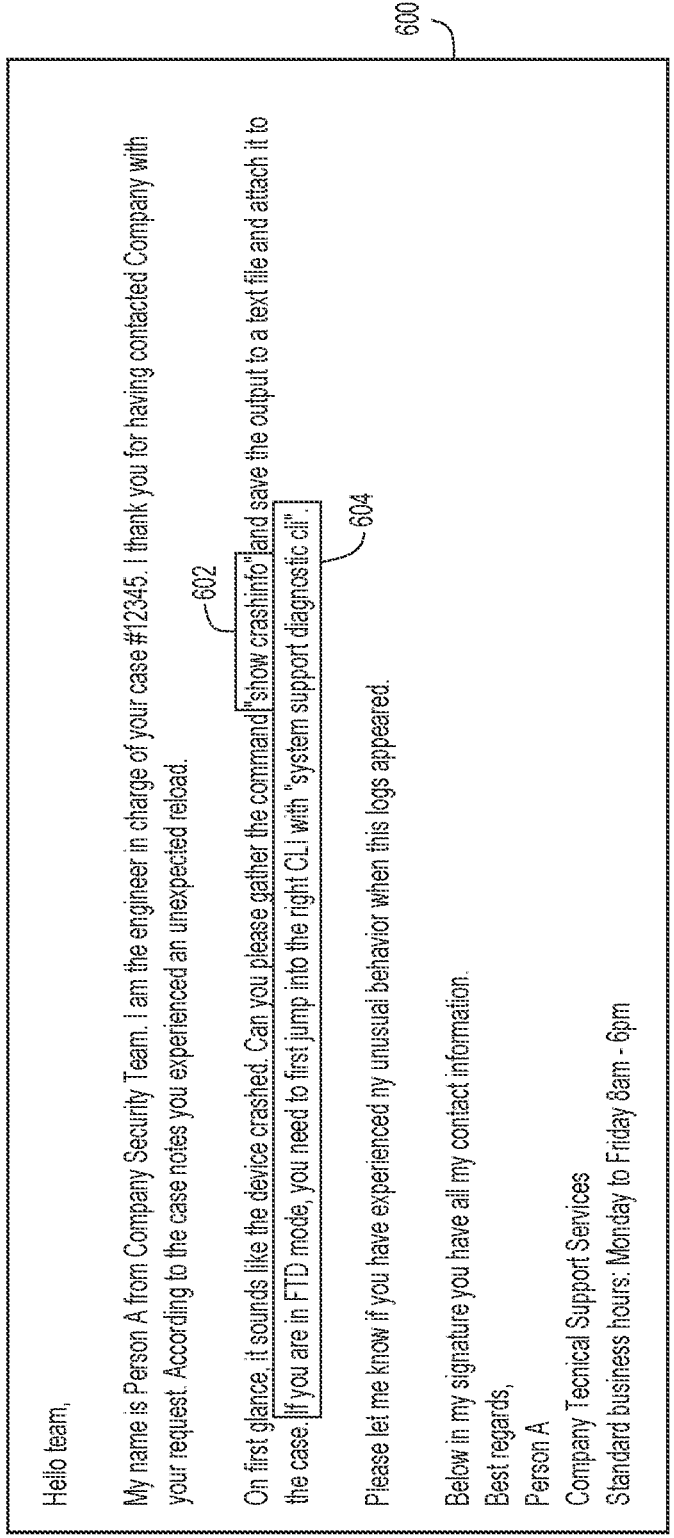

Reference is now made to FIGS. 6A-6D. FIGS. 6A-6C illustrate initial communications sent by technical support engineers to users associated with the overlapping technical support cases and FIG. 6D illustrates an example initial communication template derived from the initial communications illustrated in FIGS. 6A-6C.

FIG. 6A illustrates an email 600 that was sent from a technical support engineer to a user associated with one of the overlapping technical support cases. Email 600 includes an introduction ("My name is Person A from Company-Security team"), a case number (12345) assigned to the technical support case, and additional information specific to the technical support case. More specifically, at 602, the email 600 requests that the user gather the command "show crashinfo" and, at 604, the email 600 provides additional information that "[i]f you are in FTD mode, you need to first jump into the right CLI with 'system support diagnostic-cli'."

FIG. 6B illustrates another email 610 that was sent from a technical support engineer to a user associated with one of the overlapping technical support cases. Email 610 includes an introduction ("My name is Person B, from Company") and additional information specific to the technical support case. In particular, at 612, the email 610 includes the instructions that "[r]unning 'term pager 0' before will help the output complete quickly." At 614, email 610 includes additional instructions that say "[d]on't forget to reset the pager back to the default with 'term pager 24'."

FIG. 6C illustrates yet another email 620 that was sent from a technical support engineer to a user associated with one of the overlapping technical support cases. Email 620 includes an introduction ("My name is Person C from Company Security Team"), a case number (45678) associated with the technical support issue, and additional information specific to the technical support issue. Specifically, at 622, email 620 instructs the user that "[y]ou can upload the crash (plain text only please, not zip or rtf) file via the link here: https://company.com/SR45678."

Emails 600, 610, and 620 may be provided to LLM 110 with instructions to create an initial communication template with the same structure and intent as the emails generated by the technical support engineers. FIG. 6D illustrates an initial contact template 630 generated by the LLM 110 that may be used to create an initial contact communication to send to users associated with technical support issues whose problem descriptions are clustered with the problem descriptions of the technical support cases associated with emails 600, 610, and 620.

The initial contact template 630 includes a field for an introduction ("My name is <VIRTUAL_TAC_ENGINEER_NAME>") and a field for entering a service request number for the technical support case ("I have ownership of your Service Request: <SERVICE_REQUEST_NUMBER>"). Before the initial contact communication is sent to a user associated with a technical service issue, the fields <VIRTUAL_TAC_ENGINEER_NAME> and <SERVICE_REQUEST_NUMBER> will be filled out with the appropriate information.

The initial contact template 630 additionally includes instructions for the user to perform to resolve the issue. The instructions are based on the instructions provided by the technical support engineers in emails 600, 610, and 620. At 632, initial contact template 630 says "[i]f the standby device is deployed in Firepower Threat Defense (FTD) mode, first issue the command 'system support diagnostic-cli' and then 'enable'," which corresponds to the information provided at 604 in email 600 of FIG. 6A. At 634, initial contact template 630 says "[r]un the command 'term pager 0' to prevent the device from pausing the output with '—More—' prompts," which corresponds to the information provided at 612 in email 610 of FIG. 6B.

At 636, the initial contact template 630 says "[t]hen the command 'show crashinfo' and save the output to a text file," which is derived from the information provided at 602 in email 600 of FIG. 6A. At 638, the initial contact template 630 says "[t]hen reset the terminal length with 'term pager 24,'" which corresponds to the information provided at 614 in email 610 of FIG. 6B. At 639, the initial contact template 630 says "[r]eply-all to this email and attach that file or go to https://company.com/SR<SERVICE_REQUEST_NUMBER> and upload the file there," which corresponds to the information provided at 622 in email 620 of FIG. 6C. The field <SERVICE_REQUEST_NUMBER> will be filled out with the service request number assigned to the technical service case.

In another embodiment, case data from resolved technical support cases may be used to prompt the LLM 110 ask the LLM 110 to generate a system prompt for a second chat-based LLM. The prompt may be used to provide instructions to the chat-based LLM on how to handle the group of technical support cases and what steps/actions the chat-based LLM is to take to move a technical support case to a final resolution.

By providing an initial contact communication with information gathered from emails 600, 610, and 620 outlining how to resolve a problem outlined in a technical support issue, ideally a user will be able to resolve the technical support issue without additional guidance or information. However, in some situations, the information in the initial contact communication does not resolve a technical support issue. Referring back to FIG. 1, case data scraper 108 may be leveraged to generate a "case data scraper" template that includes question and answer pairings that may be useful to resolve a technical support case.

The case data scraper template is constructed by extracting communications between users associated with the overlapping technical support cases and the technical support engineers on the existing data set of technical support cases. The LLM 110 is prompted to leverage the back-and-forth communications to derive robust question and answer pairings. For example, the LLM 110 may identify questions that are frequently asked by users and identify the answers provided by the technical support engineers to the questions. For example, the LLM 110 may have identified that, for a particular problem, users frequently asked "What are the risks associated with this change?" or "What type of battery is used for this product?" and LLM 110 may identify the answers and associate the answers with the questions.

In some embodiments, LLM 110 may identify statements made by the users and responses made by the technical support engineers. For example, instead of asking a question, a user may say "I have purchased the battery and I will replace it soon" and the technical support engineer may respond "Please keep me posted." Therefore, in addition to extracting questions and answers from the communications, LLM 110 may extract statements and responses from the communications.

In other embodiments, instead of providing a text answer or response, an action may be performed in response to a statement or question from a user. For example, if the user says "Can I call you?," "Please send a field engineer," or "This answer is not acceptable," an action may be performed to escalate the case. As another example, if the user says "This fixed my problem" or "You can close the case," an action may be taken to close the case.

Referring back to FIG. 1, the results of the question/answer (or statement/response or statement/action) pairings is fed into the semantic analysis engine 109 and used to train the semantic analysis model for communicating with users. For example, the question/answer pairings are passed to an application programming interface (API) with an API call to train the semantic analysis engine 109 to communicate with users based on the question/answer pairings. The semantic analysis engine 109 becomes the question and answer engine for the automation process when a user responds with follow-up questions not answered within the initial contact communication. For example, the derived question and answer pairings may be used by a humanoid of the technical support service 102 to communicate with a user associated with a technical support case as a human would. The question and answer pairings may be used to request additional information from the users, provide additional information to the users to resolve the technical support cases, or respond to a user in another way.

When the initial communication template has been created and the semantic analysis engine 109 has been trained using the robust question/answer pairings, the technical support service 102 is armed with the data to start engaging on net new technical support cases as they are received. When a new technical support case is received, pre-filtering based on metadata is done to determine the technology/product information associated with the new technical support case. If the cases matches a pre-filter associated with the overlapping cases, the problem description associated with the new technical support case is added to the problem descriptions 302-1 to 302-N to see if the problem description would fit into the same cluster as the overlapping technical support cases used to create the initial contact template and the question/answer pairings.

If the problem description belongs in the cluster with the overlapping technical support cases, the technical support case may be resolved using automation by sending an initial contact communication that is generated based on the initial contact template 630 to the user associated with the new technical support case. If the technical support issue is not resolved with the initial contact communication, the trained semantic analysis engine 109 may communicate with the user based on the question/answer pairings to resolve the technical support issue. In this way, the entire process of resolving the technical support issue may be automated and performed without any human intervention based on the resolutions of similar technical support issues.

Reference is now made to FIG. 7. FIG. 7 is a flow chart illustrating a method 700 of automating resolution of a technical support issue based on related resolved technical support cases. At 702, a technical support system identifies a plurality of technical support cases that were previously resolved. At 704, related technical support cases of the plurality of technical support cases are identified based on problem descriptions and resolution summaries associated with the plurality of technical support cases. For example, a problem description for each technical support case is added to a problem description dataset and a resolution summary for each technical support case is added to a resolution summary dataset. Related problem descriptions are clustered into problem description clusters and related resolution summaries are clustered into resolution summary clusters. Related technical support cases are identified that have problem descriptions in a common problem description cluster and resolution summaries in a common resolution summary cluster.

At 706, a LLM is used to create an initial contact template for potential technical support issues associated with the related technical support cases. For example, initial contact communications from technical support engineers to users associated with the related technical support cases are transmitted to an LLM and the LLM generates an initial contact template for potential technical support issues associated with the related technical support cases based on the initial contact communications.

At 708, question and answer pairing associated with the potential technical support issues are identified based on communications in the related technical support cases. For example, the LLM identifies question/answer pairings to help resolve potential technical support issues based on questions and answers in communications between technical support engineers and users associated with the related technical support cases.

At 710, a machine learning model is trained to communicate with potential users associated with the potential technical support issues based on the question and answer pairings. At 712, the initial contact template and the machine learning model are used to resolve a subsequently received technical support issue associated with the related technical support cases. For example, when a new technical support case is received and a problem description of the new technical support case aligns with the problem descriptions of the related technical support cases, an initial contact communication may be generated based on the initial contact template and sent to a user associated with the new technical support case. If the technical support issue is not resolved based on the initial contact communication, the trained machine learning model may communicate with the user using the question/answer pairings to resolve the issue. In this way, the technical support case may be resolved without human intervention based on resolutions of technical support cases that have the same or similar problem description as the new technical support case.

Figure 8:
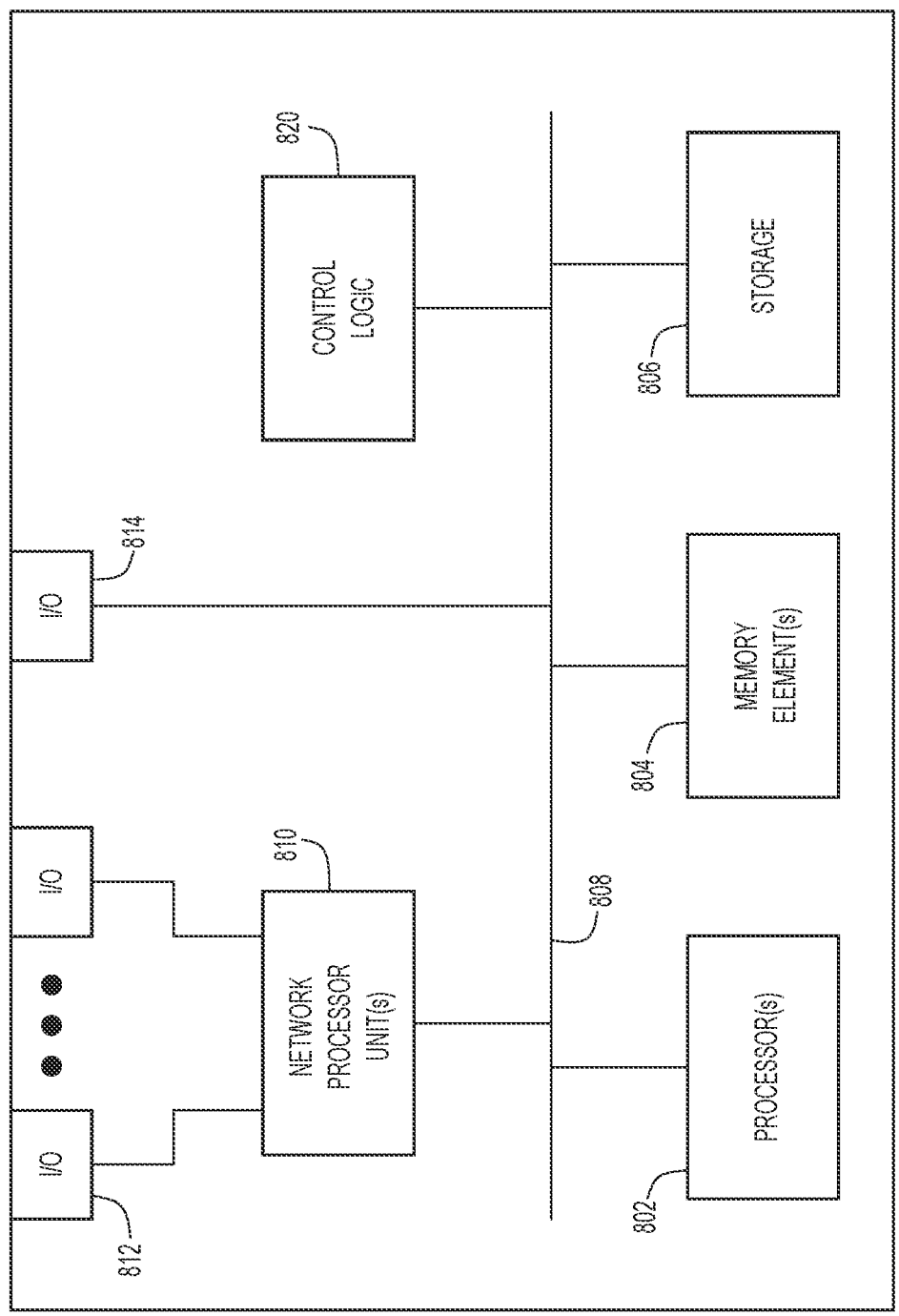
FIG. 8 is a hardware diagram of a computer device that may be configured to perform the technical support system features involved in determining whether to respond to a multi-party communication and responding to the multi-party communication, according to an example embodiment.

Referring to FIG. 8, FIG. 8 illustrates a hardware block diagram of a computing/computer device 800 that may perform functions of a device associated with operations discussed herein in connection with the techniques depicted in FIGS. 1-5, 6A-6D, and 7. In various embodiments, a computing device, such as computing device 800 or any combination of computing devices 800, may be configured as any devices as discussed for the techniques depicted in connection with FIGS. 1-5, 6A-6D, and 7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, mouse, display, a touch screen display, and/or any other suitable input and/or output device now known or hereafter developed. These user input devices may be used by a user to initiate a monitoring session and to specify where the results of the monitoring session are to be delivered, as described above. This may be the case, in particular, when the computing device 800 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 800 serves as a user device as described herein.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that includes identifying, by a technical support system, a plurality of technical support cases that were previously resolved; identifying related technical support cases of the plurality of technical support cases based on problem descriptions and resolution summaries associated with the plurality of technical support cases; using a Large Language Model (LLM) to create an initial contact template for potential technical support issues associated with the related technical support cases; identifying question and answer pairings associated with the potential technical support issues based on communications in the related technical support cases; training a machine learning model to communicate with potential users associated with the potential technical support issues based on the question and answer pairings; and using the initial contact template and the machine learning model to resolve a subsequently received technical support issue associated with the related technical support cases.

In one example, identifying the related technical support cases includes: extracting a problem description and a resolution summary for each technical support case of the plurality of technical support cases; dividing the problem descriptions for the plurality of technical support cases into a problem description dataset and the resolution summaries for the plurality of technical support cases into a resolution summary dataset; clustering the problem description dataset into problem description clusters to identify closely matching problem descriptions; and clustering the resolution summary dataset into resolution summary clusters to identify closely matching resolution summaries.

In another example, the method further includes identifying the related technical support cases as particular technical support cases whose problem descriptions are clustered in a single problem description cluster and whose resolution summaries are clustered in a single resolution summary cluster. In another example, using the initial contact template and the machine learning model to resolve a subsequently received technical support issue associated with the related technical support cases includes: receiving the subsequently received technical support issue from a user; determining whether a problem description associated with the subsequently received technical support issue is clustered in the single problem description cluster; determining that the subsequently received technical support issue is associated with the related technical support cases in response to determining that the subsequently received technical support issue is clustered in the single problem description cluster; and transmitting an initial contact communication associated with the initial contact template to the user.

In another example, using the LLM to create the initial contact template includes: providing initial communications that were sent to users associated with the related technical support cases to the LLM with instructions to generate the initial contact template that aligns with structures of the initial communications and attempts to resolve the potential technical support issues. In another example, identifying the question and answer pairings includes: providing communications that were transmitted between users and support engineers associated with the related technical support cases to the LLM with instructions to identify the question and answer pairings based on the communications. In another example, identifying the plurality of technical support cases includes filtering technical support cases by metadata to identify the plurality of technical support cases.

In another form, an apparatus of a technical support system is provided that includes a memory; a network interface configured to enable network communication; and a processor, wherein the processor is configured to perform operations including: identifying a plurality of technical support cases that were previously resolved; identifying related technical support cases of the plurality of technical support cases based on problem descriptions and resolution summaries associated with the plurality of technical support cases; using a Large Language Model (LLM) to create an initial contact template for potential technical support issues associated with the related technical support cases; identifying question and answer pairings associated with the potential technical support issues based on communications in the related technical support cases; training a machine learning model to communicate with potential users associated with the potential technical support issues based on the question and answer pairings; and using the initial contact template and the machine learning model to resolve a subsequently received technical support issue associated with the related technical support cases.

In another form, one or more non-transitory computer readable storage media encoded with instructions are provided that, when executed by a processor of a technical support system, cause the processor to execute a method including: identifying a plurality of technical support cases that were previously resolved; identifying related technical support cases of the plurality of technical support cases based on problem descriptions and resolution summaries associated with the plurality of technical support cases; using a Large Language Model (LLM) to create an initial contact template for potential technical support issues associated with the related technical support cases; identifying question and answer pairings associated with the potential technical support issues based on communications in the related technical support cases; training a machine learning model to communicate with potential users associated with the potential technical support issues based on the question and answer pairings; and using the initial contact template and the machine learning model to resolve a subsequently received technical support issue associated with the related technical support cases.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
    identifying, by a technical support system, a plurality of technical support cases that were previously resolved;
    extracting a problem description and a resolution summary for each technical support case of the plurality of technical support cases;
    dividing the problem descriptions for the plurality of technical support cases into a problem description dataset and the resolution summaries for the plurality of technical support cases into a resolution summary dataset;
    clustering the problem description dataset into problem description clusters to identify closely matching problem descriptions;
    clustering the resolution summary dataset into resolution summary clusters to identify closely matching resolution summaries;
    identifying related technical support cases of the plurality of technical support cases based on the problem description clusters and the resolution summary clusters;
    using a Large Language Model (LLM) to create an initial contact template for potential technical support issues associated with the related technical support cases;
    identifying question and answer pairings associated with the potential technical support issues based on communications in the related technical support cases;
    training a machine learning model to communicate with potential users associated with the potential technical support issues based on the question and answer pairings;
    obtaining a subsequently received technical support issue from a user;
    determining that the subsequently received technical support issue is associated with the related technical support cases based on a problem description associated with the subsequently received technical support issue being clustered with the problem description clusters associated with the related technical support cases; and
    using the initial contact template and the machine learning model to resolve the subsequently received technical support issue associated with the related technical support cases.

2. The computer-implemented method of claim 1, further comprising:
    identifying the related technical support cases as particular technical support cases whose problem descriptions are clustered in a single problem description cluster and whose resolution summaries are clustered in a single resolution summary cluster.

3. The computer-implemented method of claim 2, wherein determining that the subsequently received technical support issue is associated with the related technical support cases comprises:
    determining whether a problem description associated with the subsequently received technical support issue is clustered in the single problem description cluster; and
    determining that the subsequently received technical support issue is associated with the related technical support cases in response to determining that the subsequently received technical support issue is clustered in the single problem description cluster; and
    wherein using the initial contact template and the machine learning model to resolve the subsequently received technical support issue comprises:
        transmitting an initial contact communication associated with the initial contact template to the user.

4. The computer-implemented method of claim 1, wherein using the LLM to create the initial contact template comprises:
    providing initial communications that were sent to users associated with the related technical support cases to the LLM with instructions to generate the initial contact template that aligns with structures of the initial communications and attempts to resolve the potential technical support issues.

5. The computer-implemented method of claim 1, wherein identifying the question and answer pairings comprises:
    providing communications that were transmitted between users and support engineers associated with the related technical support cases to the LLM with instructions to identify the question and answer pairings based on the communications.

6. The computer-implemented method of claim 1, wherein identifying the plurality of technical support cases comprises filtering technical support cases by metadata to identify the plurality of technical support cases.

7. The computer-implemented method of claim 1, further comprising:
    refining the problem description clusters to produce refined problem description clusters that include a percentage of the problem descriptions that are closest to a centroid of the problem description clusters; and
    refining the resolution summary clusters to produce refined resolution summary clusters that include the percentage of the resolution summaries that are closest to a centroid of the resolution summary clusters.

8. An apparatus of a technical support system comprising:
    a memory;
    a network interface configured to enable network communication; and
    a processor, wherein the processor is configured to perform operations comprising:
        identifying a plurality of technical support cases that were previously resolved;
        extracting a problem description and a resolution summary for each technical support case of the plurality of technical support cases;
        dividing the problem descriptions for the plurality of technical support cases into a problem description dataset and the resolution summaries for the plurality of technical support cases into a resolution summary dataset;
        clustering the problem description dataset into problem description clusters to identify closely matching problem descriptions;
        clustering the resolution summary dataset into resolution summary clusters to identify closely matching resolution summaries;

identifying related technical support cases of the plurality of technical support cases based on the problem description clusters and the resolution summary clusters;

using a Large Language Model (LLM) to create an initial contact template for potential technical support issues associated with the related technical support cases;

identifying question and answer pairings associated with the potential technical support issues based on communications in the related technical support cases;

training a machine learning model to communicate with potential users associated with the potential technical support issues based on the question and answer pairings;

obtaining a subsequently received technical support issue from a user;

determining that the subsequently received technical support issue is associated with the related technical support cases based on a problem description associated with the subsequently received technical support issue being clustered with the problem description clusters associated with the related technical support cases; and using the initial contact template and the machine learning model to resolve the subsequently received technical support issue associated with the related technical support cases.

9. The apparatus of claim 8, wherein the processor is further configured to perform operations comprising:
identifying the related technical support cases as particular technical support cases whose problem descriptions are clustered in a single problem description cluster and whose resolution summaries are clustered in a single resolution summary cluster.

10. The apparatus of claim 9, wherein, when determining that the subsequently received technical support issue is associated with the related technical support cases, the processor is further configured to perform operations comprising:
determining whether a problem description associated with the subsequently received technical support issue is clustered in the single problem description cluster; and
determining that the subsequently received technical support issue is associated with the related technical support cases in response to determining that the subsequently received technical support issue is clustered in the single problem description cluster; and
wherein using the initial contact template and the machine learning model to resolve the subsequently received technical support issue comprises:
transmitting an initial contact communication associated with the initial contact template to the user.

11. The apparatus of claim 8, wherein, when using the LLM to create the initial contact template, the processor is further configured to perform operations comprising:
providing initial communications that were sent to users associated with the related technical support cases to the LLM with instructions to generate the initial contact template that aligns with structures of the initial communications and attempts to resolve the potential technical support issues.

12. The apparatus of claim 8, wherein, when identifying the question and answer pairings, the processor is further configured to perform operations comprising:
providing communications that were transmitted between users and support engineers associated with the related technical support cases to the LLM with instructions to identify the question and answer pairings based on the communications.

13. The apparatus of claim 8, wherein, when identifying the plurality of technical support cases, the processor is further configured to perform operations comprising filtering technical support cases by metadata to identify the plurality of technical support cases.

14. The apparatus of claim 8, wherein the processor is further configured to perform operations comprising:
refining the problem description clusters to produce refined problem description clusters that include a percentage of the problem descriptions that are closest to a centroid of the problem description clusters; and
refining the resolution summary clusters to produce refined resolution summary clusters that include the percentage of the resolution summaries that are closest to a centroid of the resolution summary clusters.

15. One or more non-transitory computer readable storage media encoded with instructions that, when executed by a processor of a technical support system, cause the processor to execute a method comprising:
identifying a plurality of technical support cases that were previously resolved;
extracting a problem description and a resolution summary for each technical support case of the plurality of technical support cases;
dividing the problem descriptions for the plurality of technical support cases into a problem description dataset and the resolution summaries for the plurality of technical support cases into a resolution summary dataset;
clustering the problem description dataset into problem description clusters to identify closely matching problem descriptions;
clustering the resolution summary dataset into resolution summary clusters to identify closely matching resolution summaries;
identifying related technical support cases of the plurality of technical support cases based on the problem description clusters and the resolution summary clusters;
using a Large Language Model (LLM) to create an initial contact template for potential technical support issues associated with the related technical support cases;
identifying question and answer pairings associated with the potential technical support issues based on communications in the related technical support cases;
training a machine learning model to communicate with potential users associated with the potential technical support issues based on the question and answer pairings;
obtaining a subsequently received technical support issue from a user;
determining that the subsequently received technical support issue is associated with the related technical support cases based on a problem description associated with the subsequently received technical support issue being clustered with the problem description clusters associated with the related technical support cases; and using the initial contact template and the machine learning model to resolve the subsequently received technical support issue associated with the related technical support cases.

16. The one or more non-transitory computer readable storage media of claim 15, wherein the method further comprises:
identifying the related technical support cases as particular technical support cases whose problem descriptions are clustered in a single problem description cluster and whose resolution summaries are clustered in a single resolution summary cluster.

17. The one or more non-transitory computer readable storage media of claim 16, wherein determining that the subsequently received technical support issue is associated with the related technical support cases comprises:
determining whether a problem description associated with the subsequently received technical support issue is clustered in the single problem description cluster; and
determining that the subsequently received technical support issue is associated with the related technical support cases in response to determining that the subsequently received technical support issue is clustered in the single problem description cluster; and
wherein using the initial contact template and the machine learning model to resolve the subsequently received technical support issue comprises:
transmitting an initial contact communication associated with the initial contact template to the user.

18. The one or more non-transitory computer readable storage media of claim 15, wherein using the LLM to create the initial contact template comprises:
providing initial communications that were sent to users associated with the related technical support cases to the LLM with instructions to generate the initial contact template that aligns with structures of the initial communications and attempts to resolve the potential technical support issues.

19. The one or more non-transitory computer readable storage media of claim 15, wherein identifying the question and answer pairings comprises:
providing communications that were transmitted between users and support engineers associated with the related technical support cases to the LLM with instructions to identify the question and answer pairings based on the communications.

20. The one or more non-transitory computer readable storage media of claim 15, wherein the method further comprises:
refining the problem description clusters to produce refined problem description clusters that include a percentage of the problem descriptions that are closest to a centroid of the problem description clusters; and
refining the resolution summary clusters to produce refined resolution summary clusters that include the percentage of the resolution summaries that are closest to a centroid of the resolution summary clusters.

* * * * *